Nov. 27, 1923.  1,475,324
J. W. SNEDEKER
FENCE LOOM
Filed Sept. 13, 1922  17 Sheets-Sheet 3
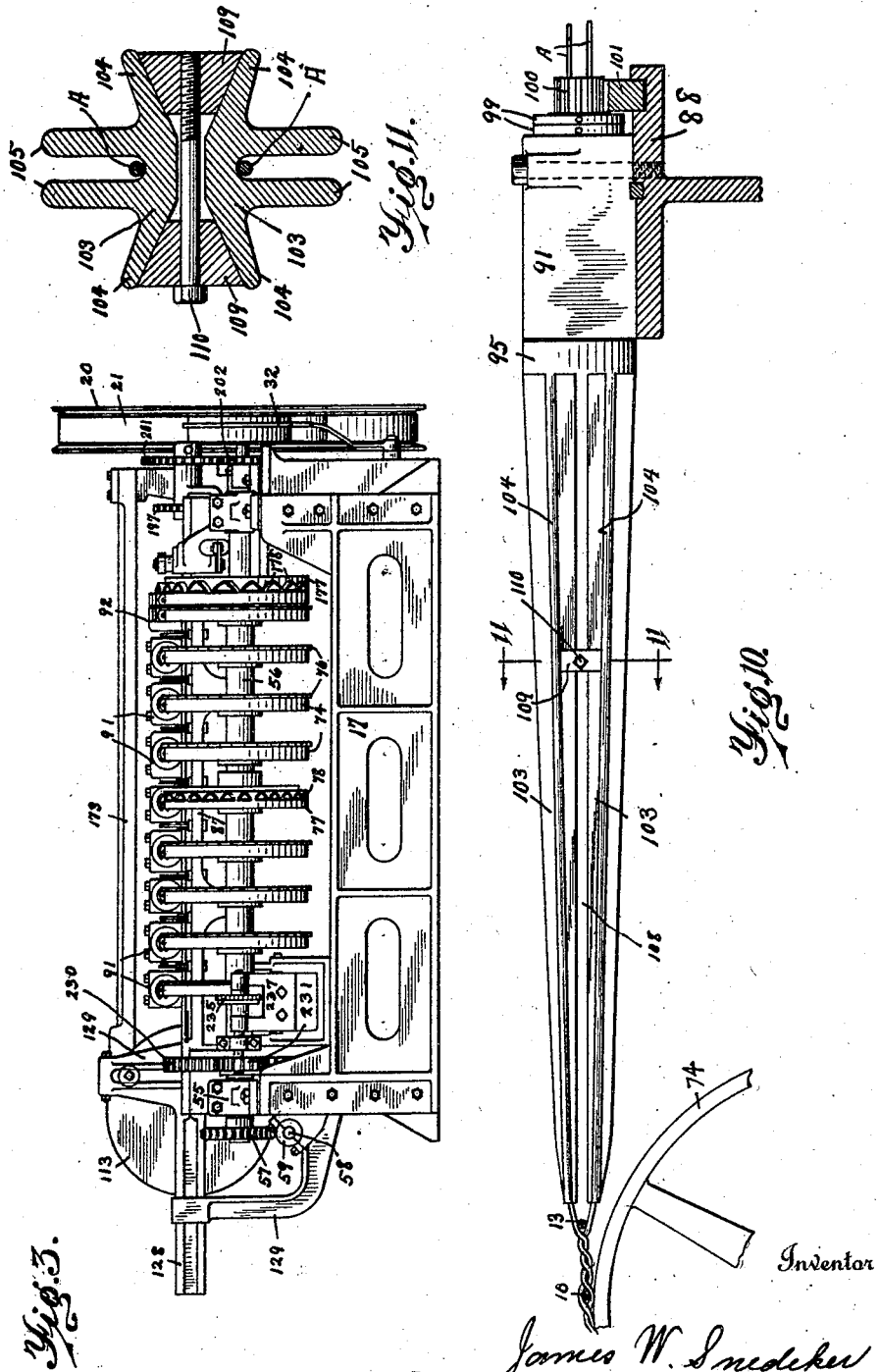

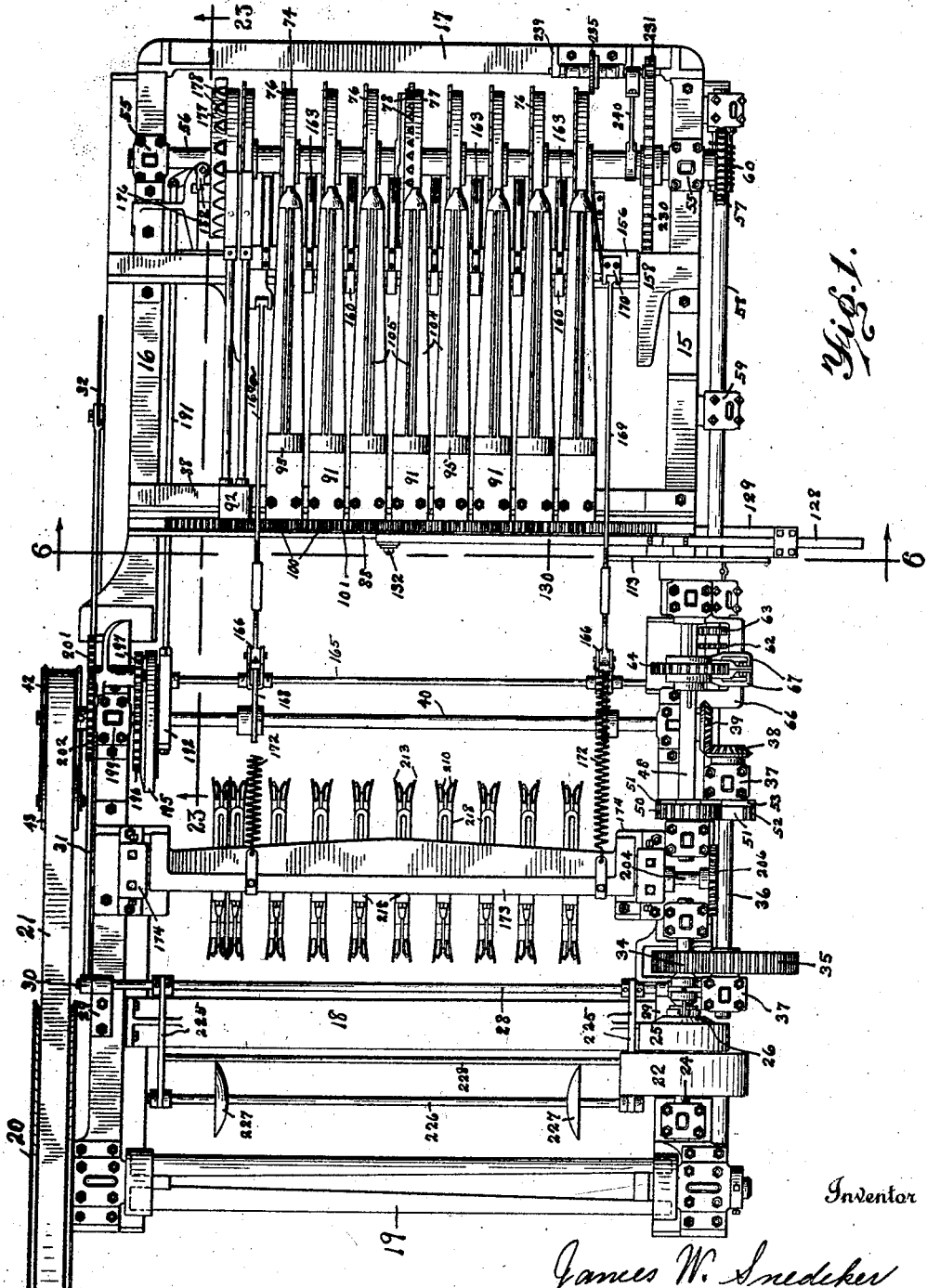

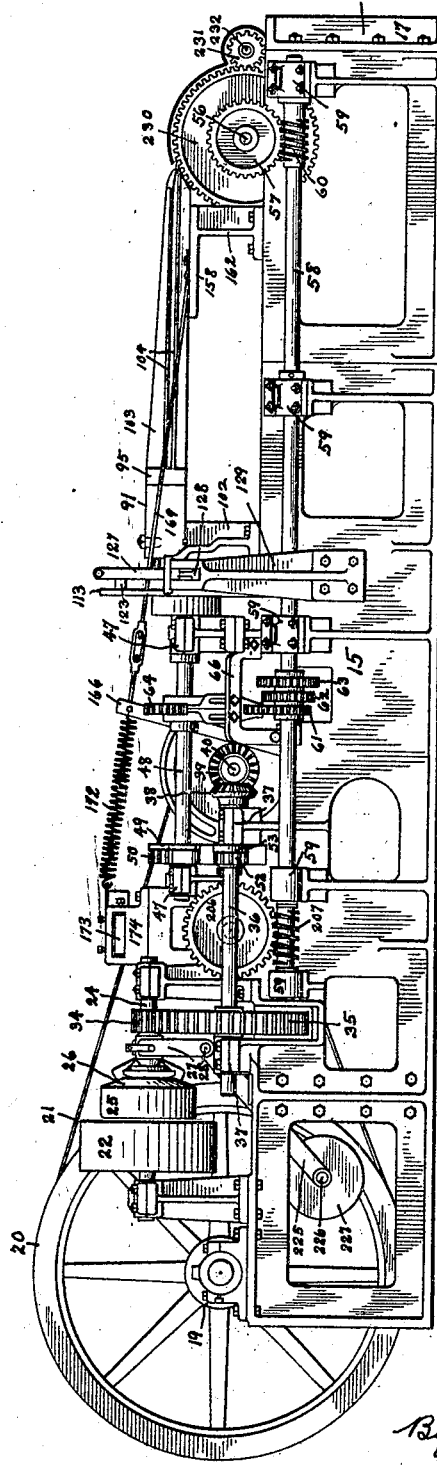

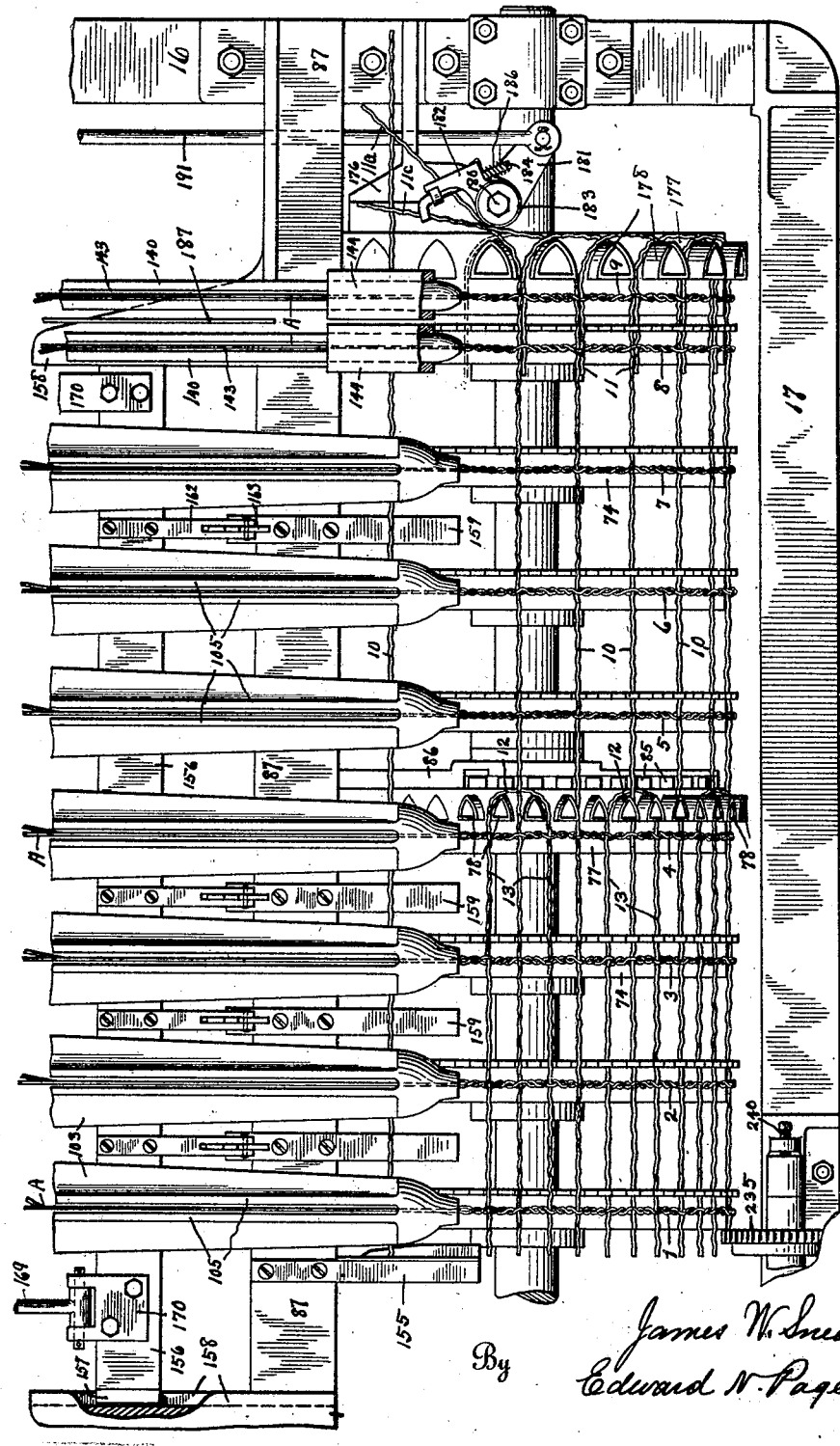

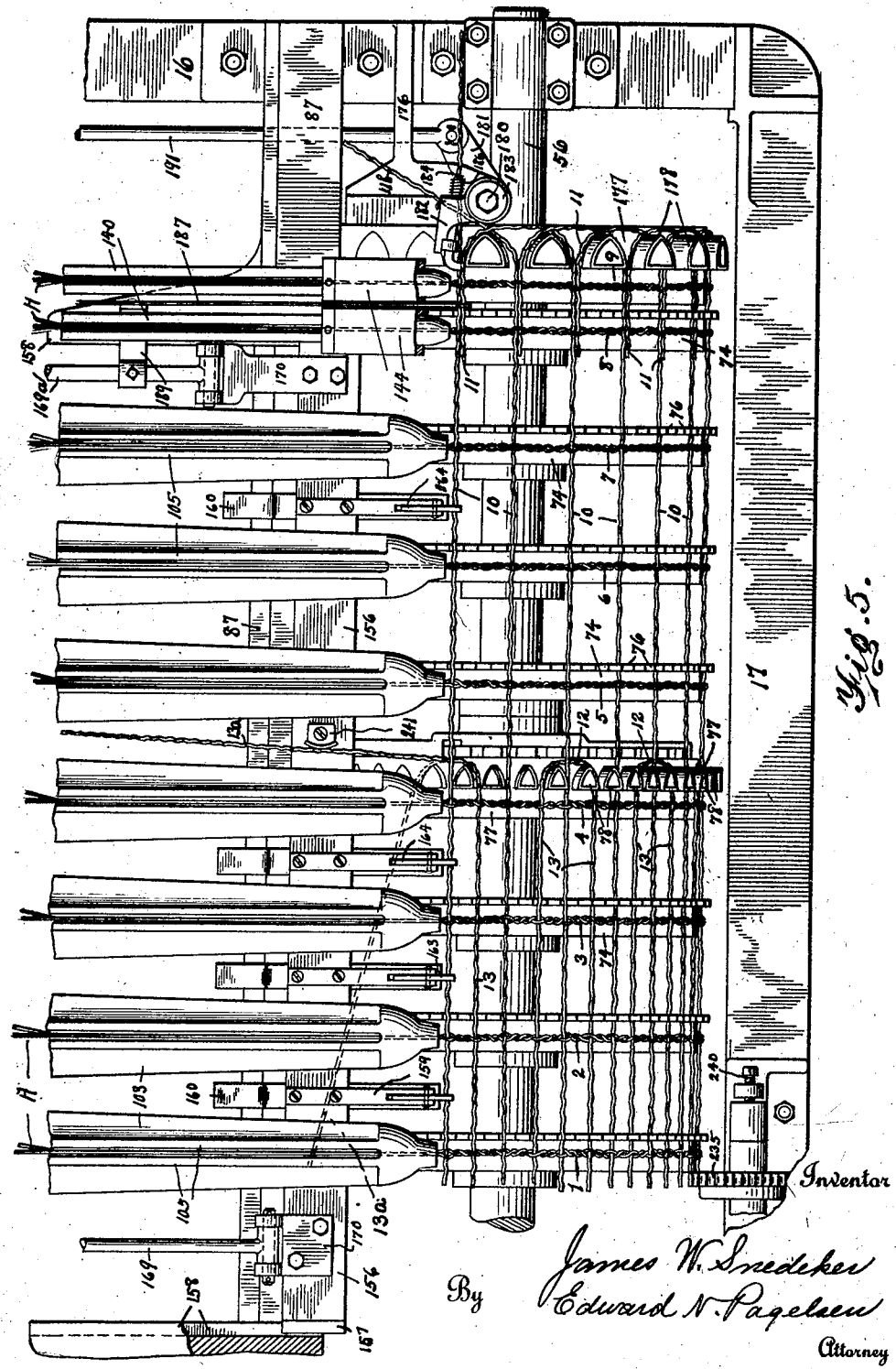

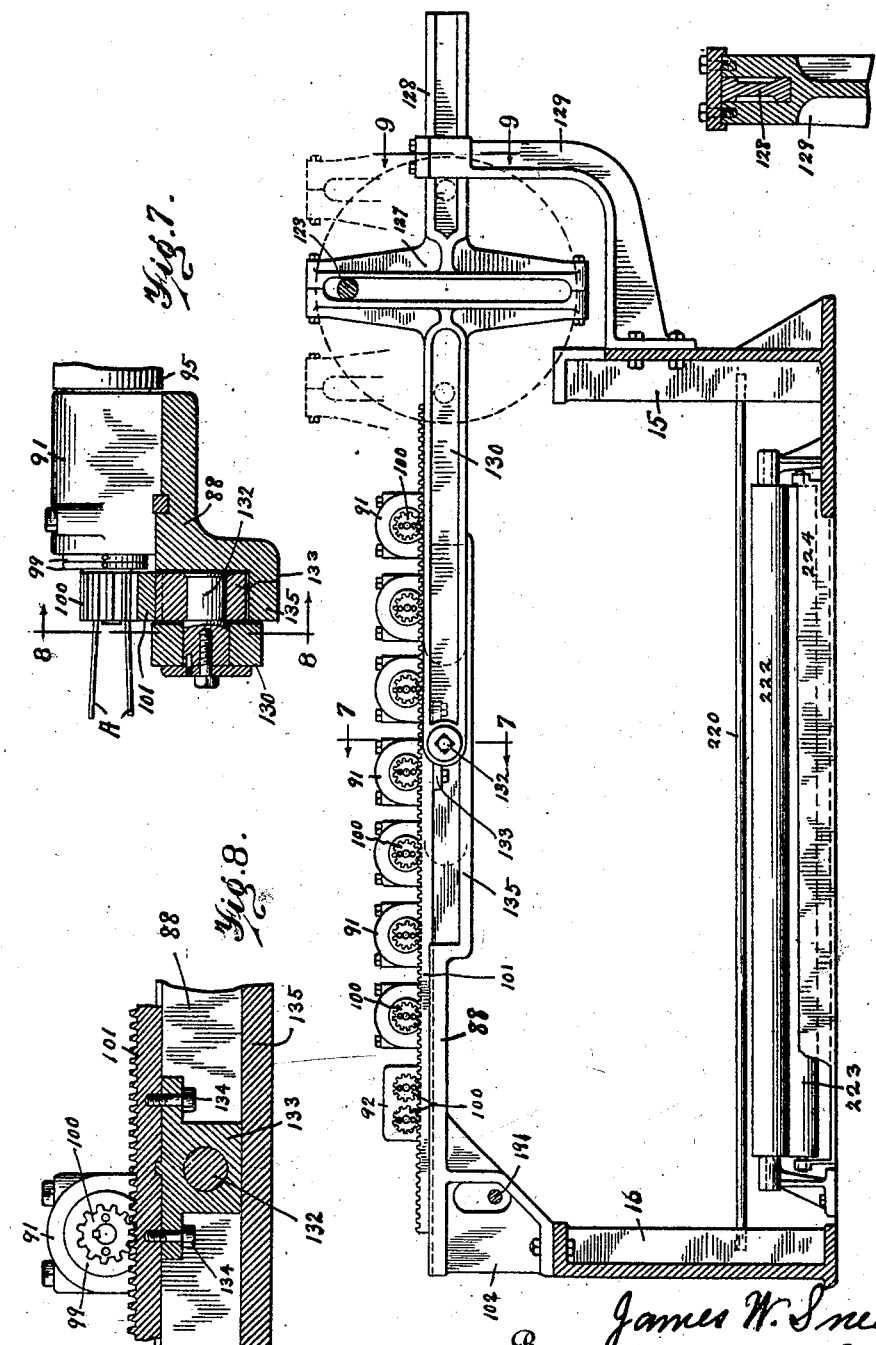

Nov. 27, 1923.                                             1,475,324
                      J. W. SNEDEKER
                        FENCE LOOM
                  Filed Sept. 13, 1922          17 Sheets-Sheet 7
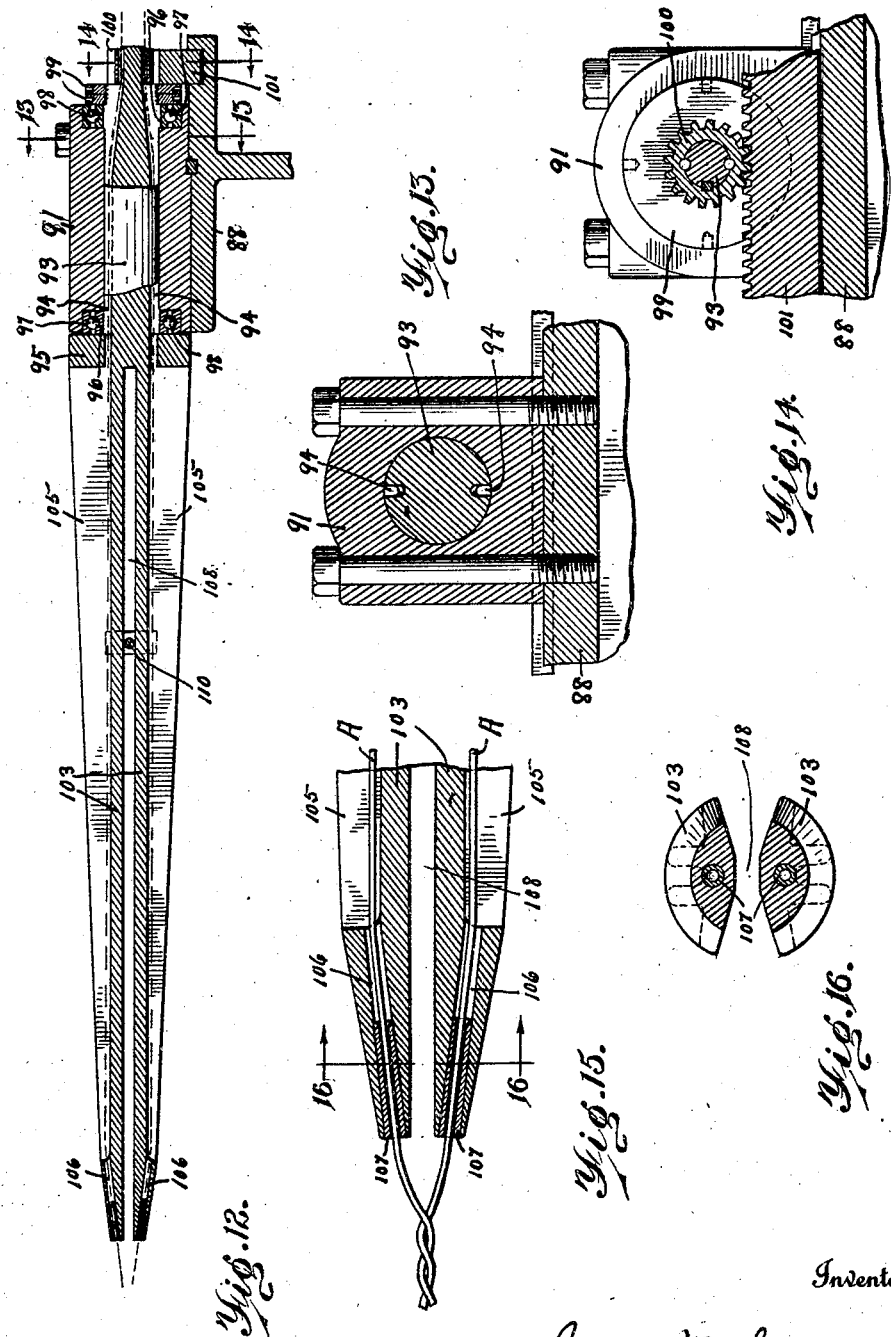
Inventor
James W. Snedeker
By Edward N. Pageleew
Attorney Nov. 27, 1923.
J. W. SNEDEKER
FENCE LOOM
Filed Sept. 13, 1922   17 Sheets-Sheet 8
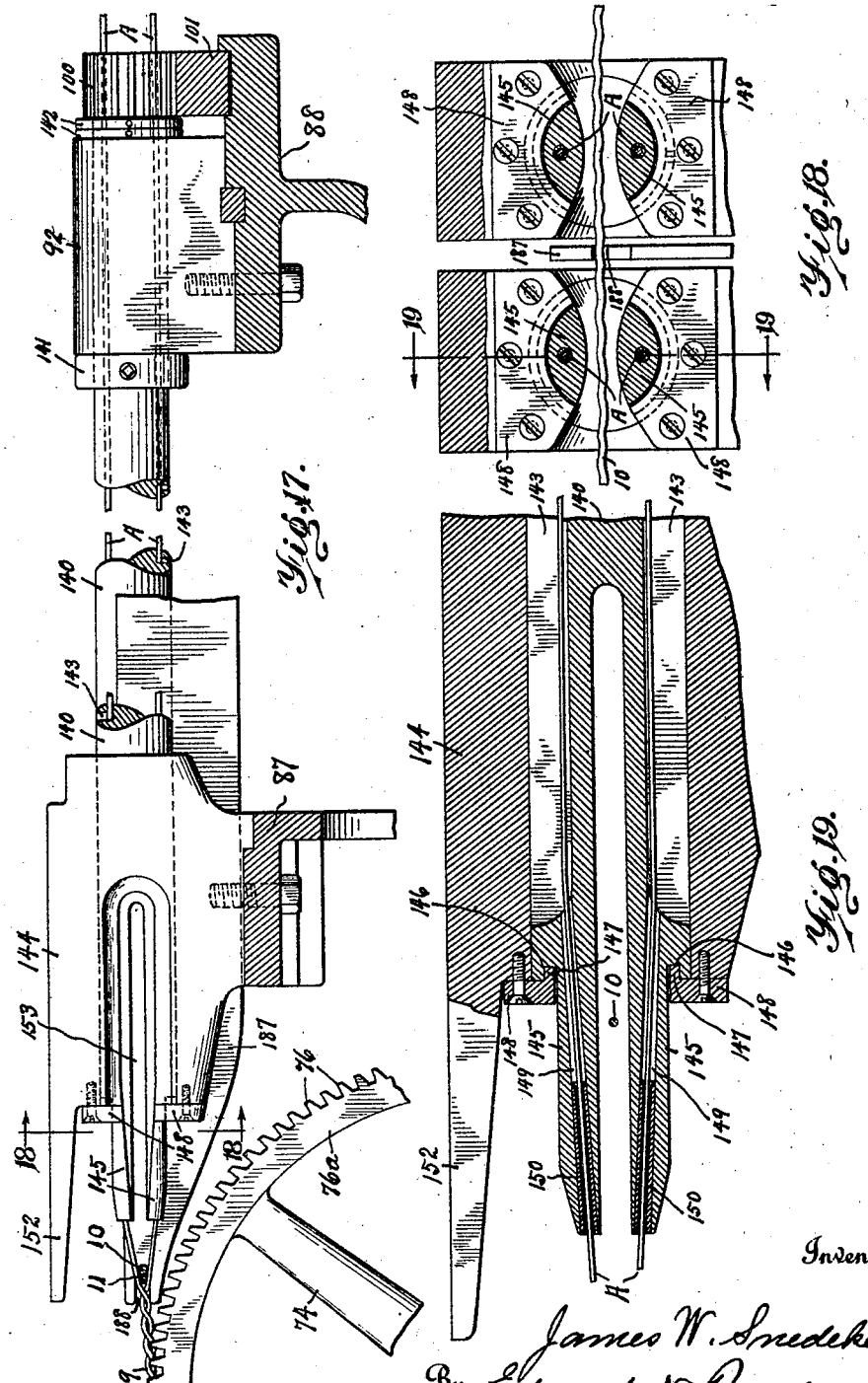
Inventor
James W. Snedeker
By Edward N. Pagelsen
Attorney

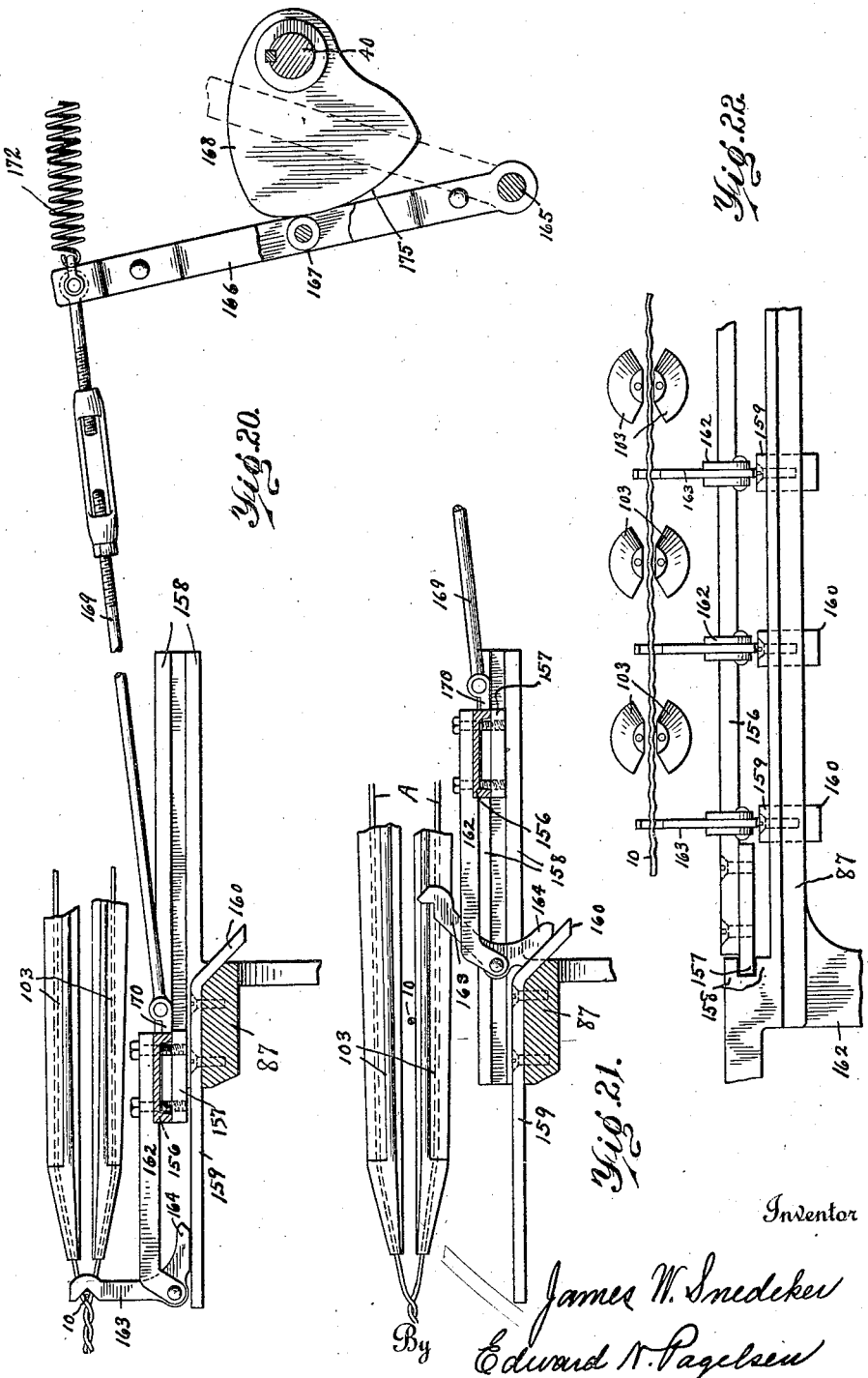

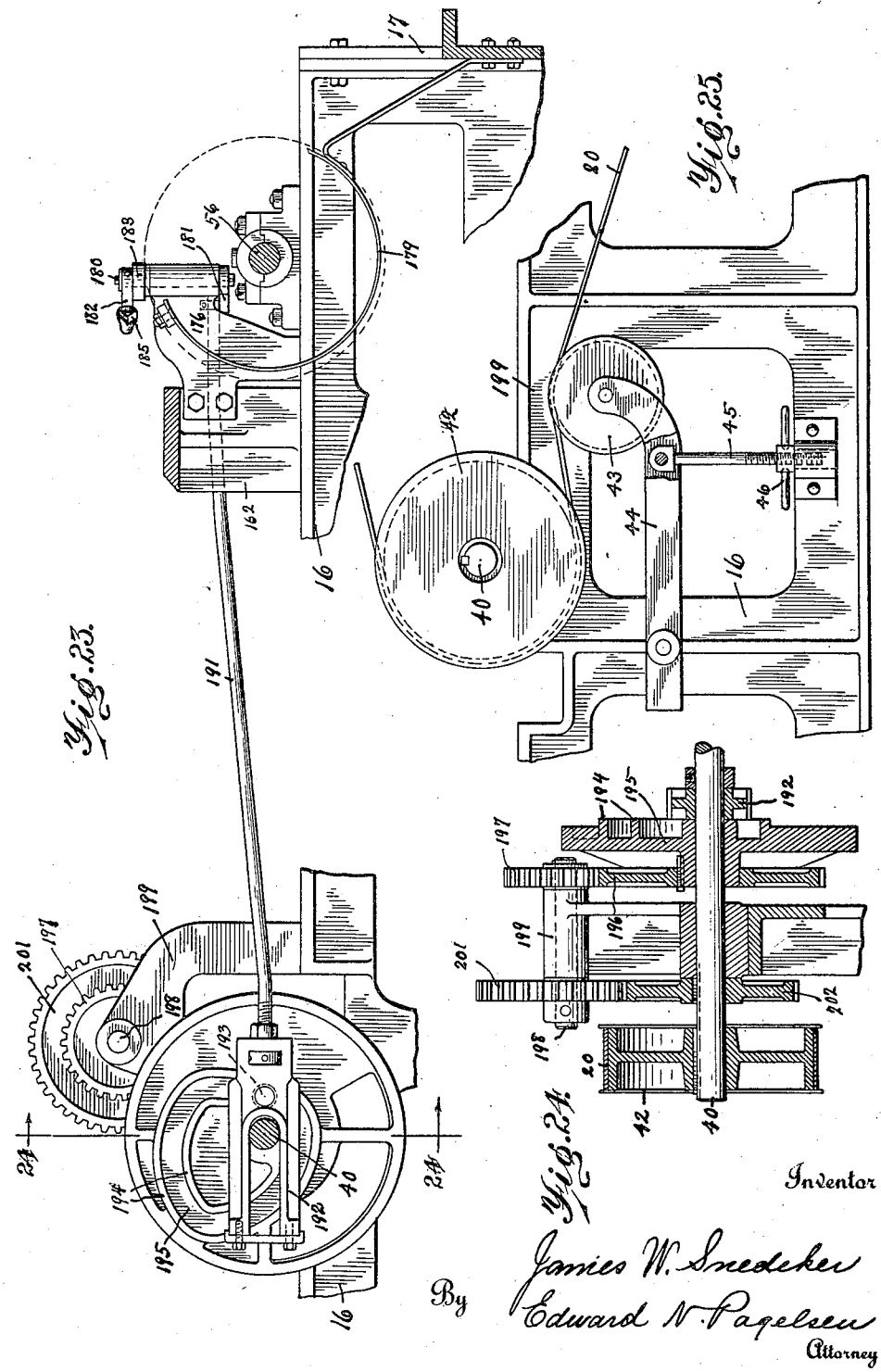

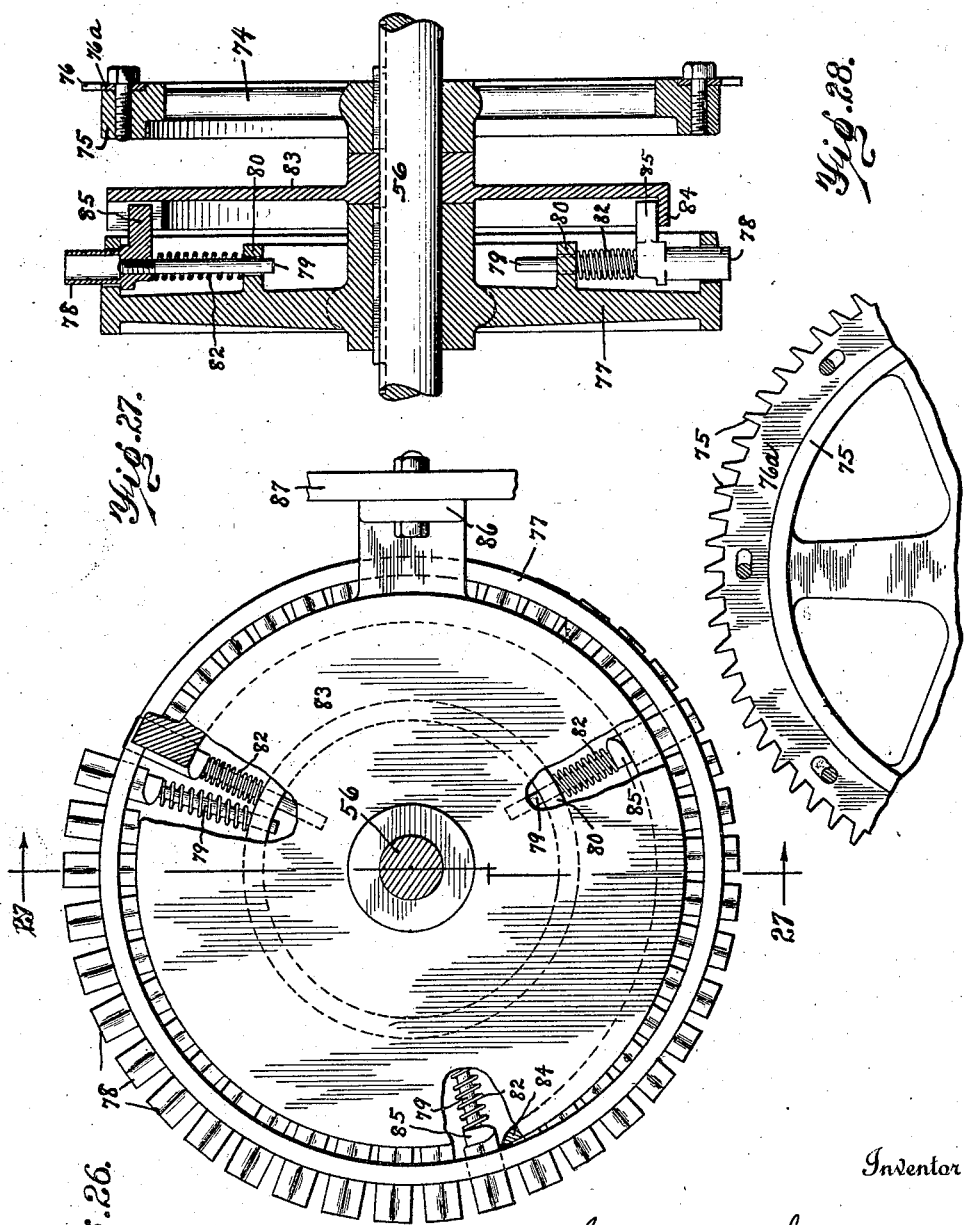

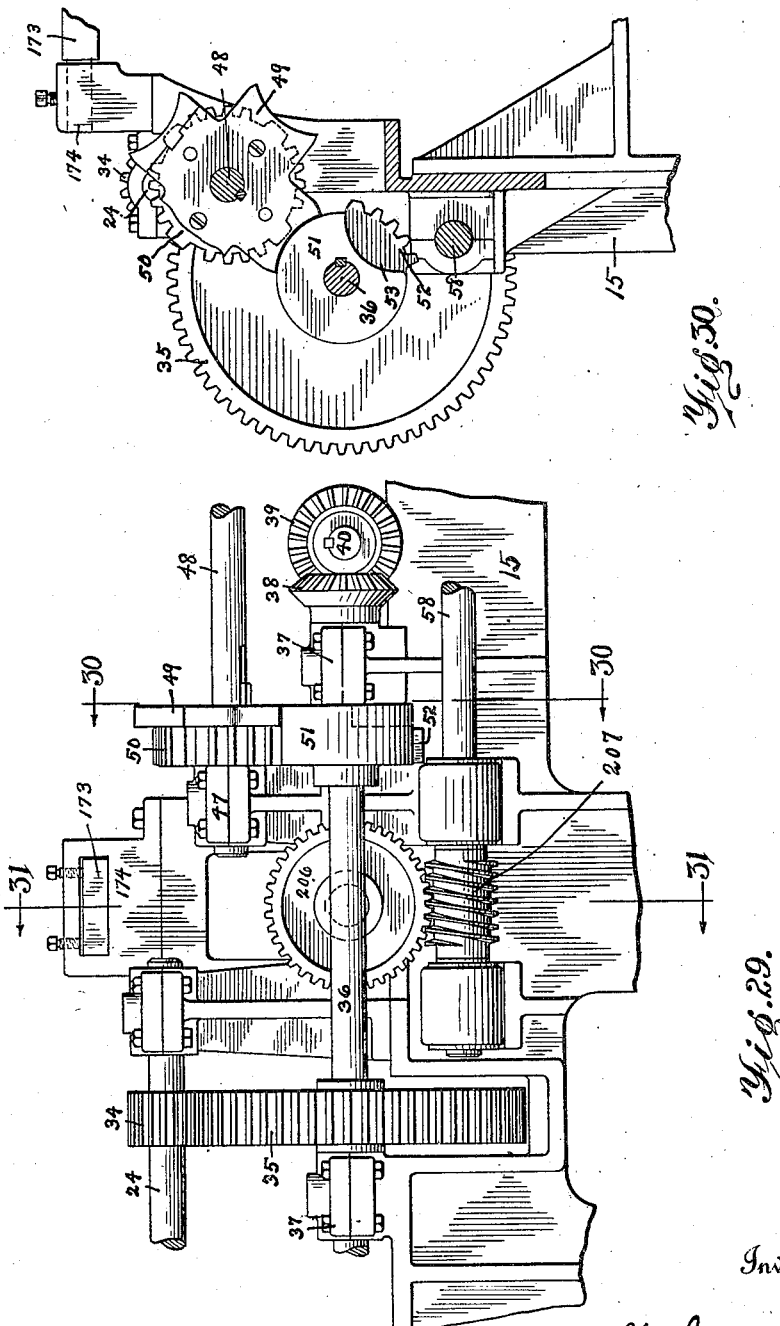

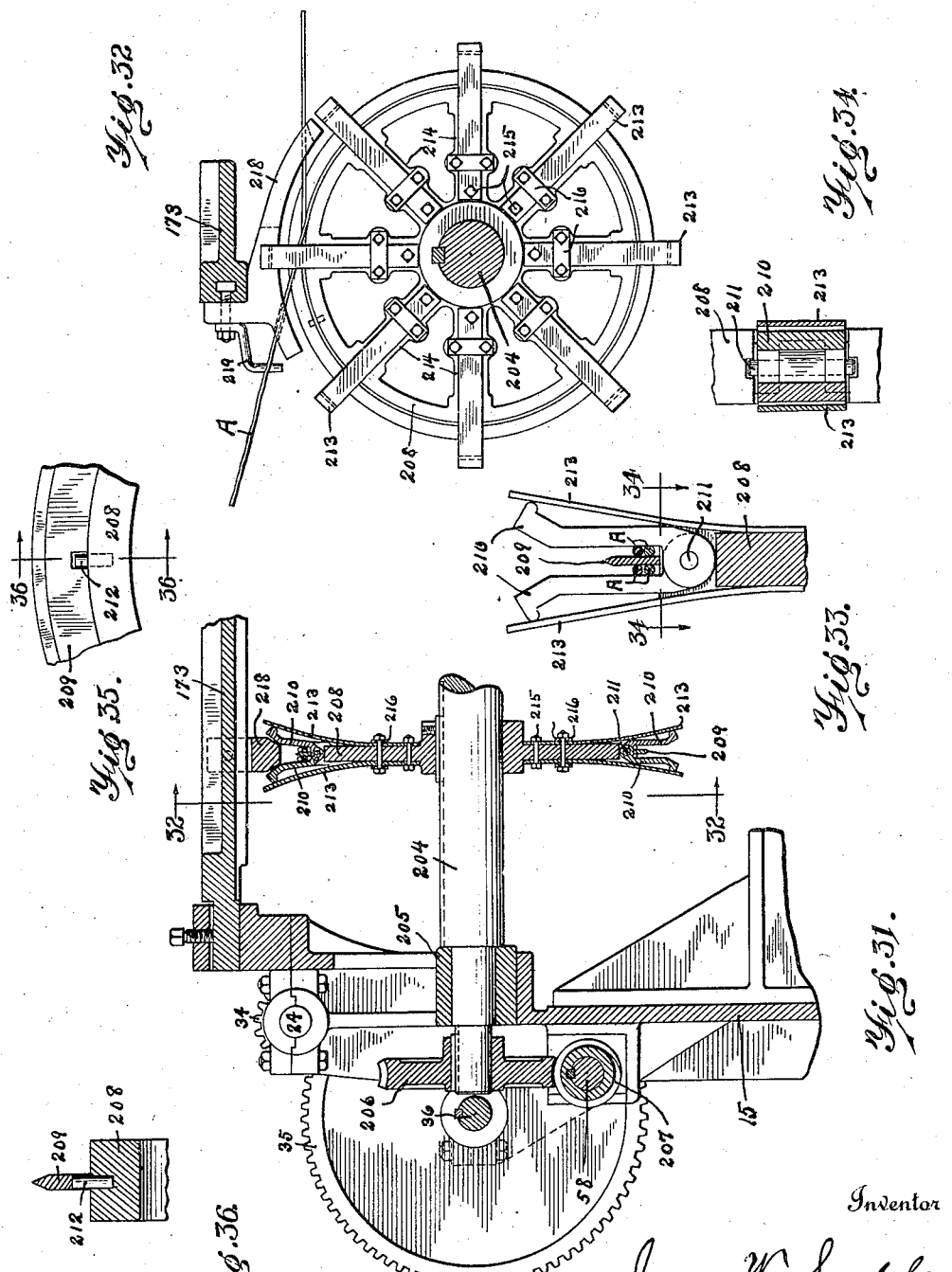

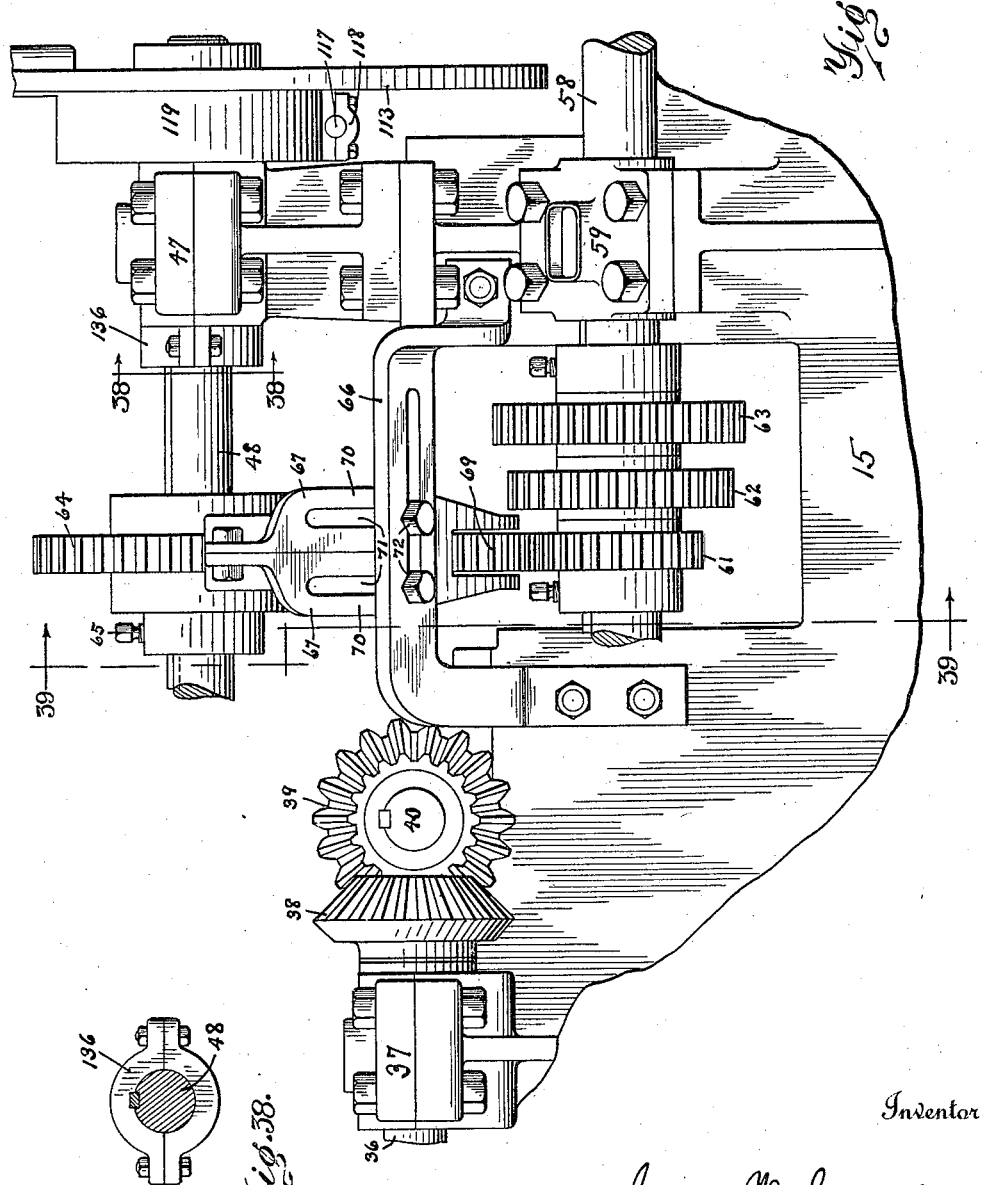

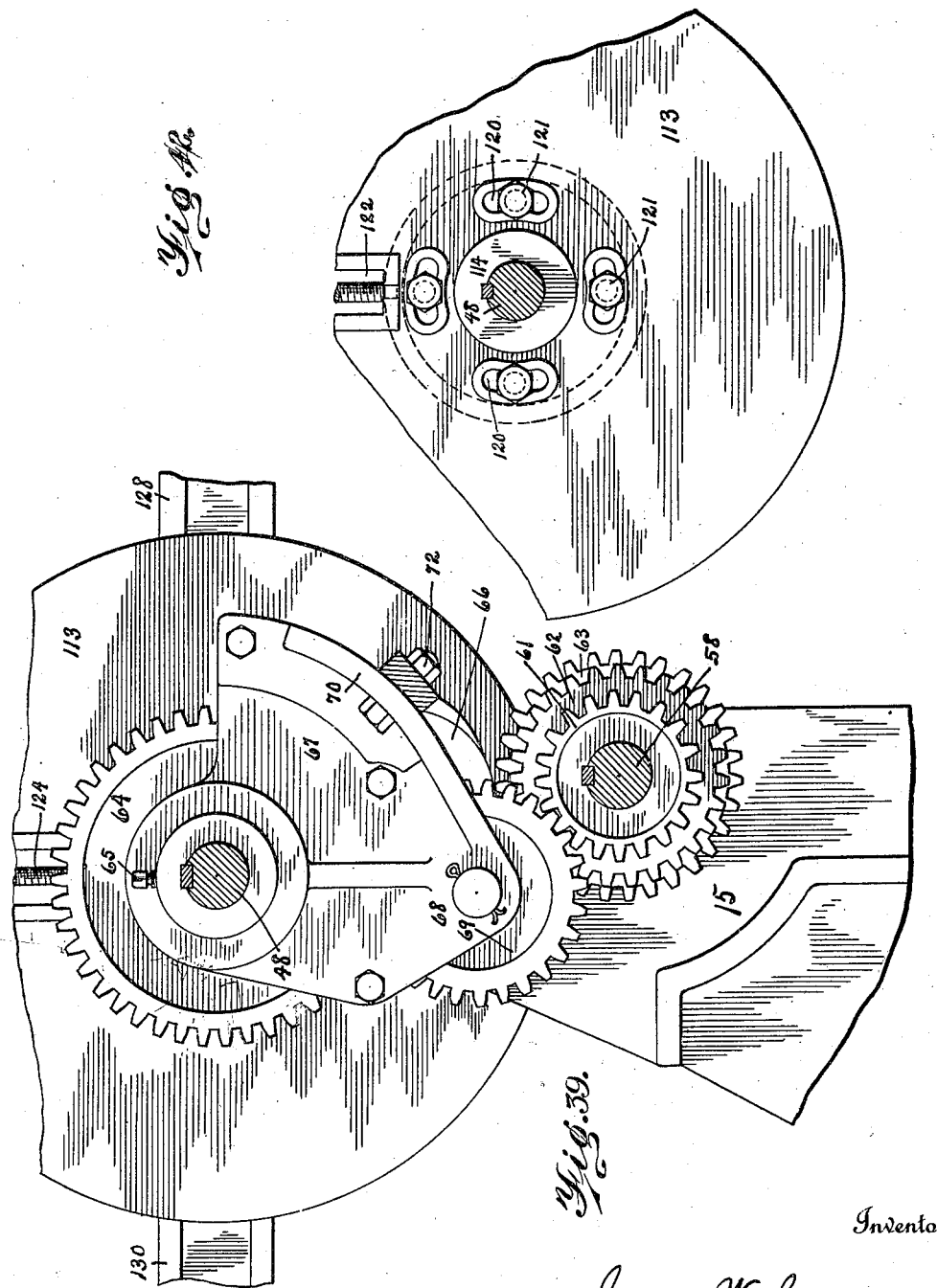

Nov. 27, 1923.　　　　　　　　　　　　　　　　1,475,324
J. W. SNEDEKER
FENCE LOOM
Filed Sept. 13, 1922　　17 Sheets-Sheet 16
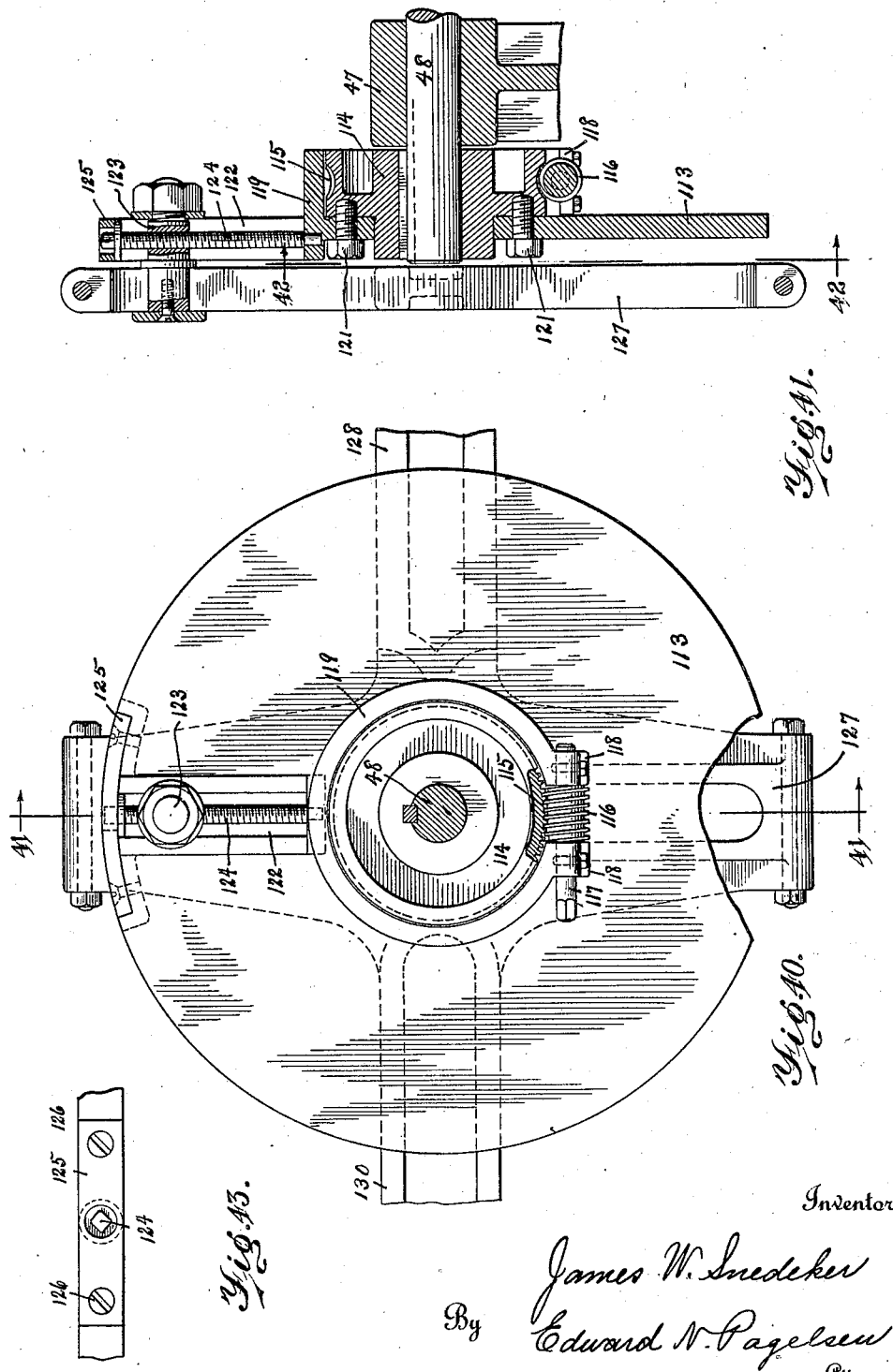
Inventor
James W. Snedeker
By Edward N. Pagelsen
Attorney

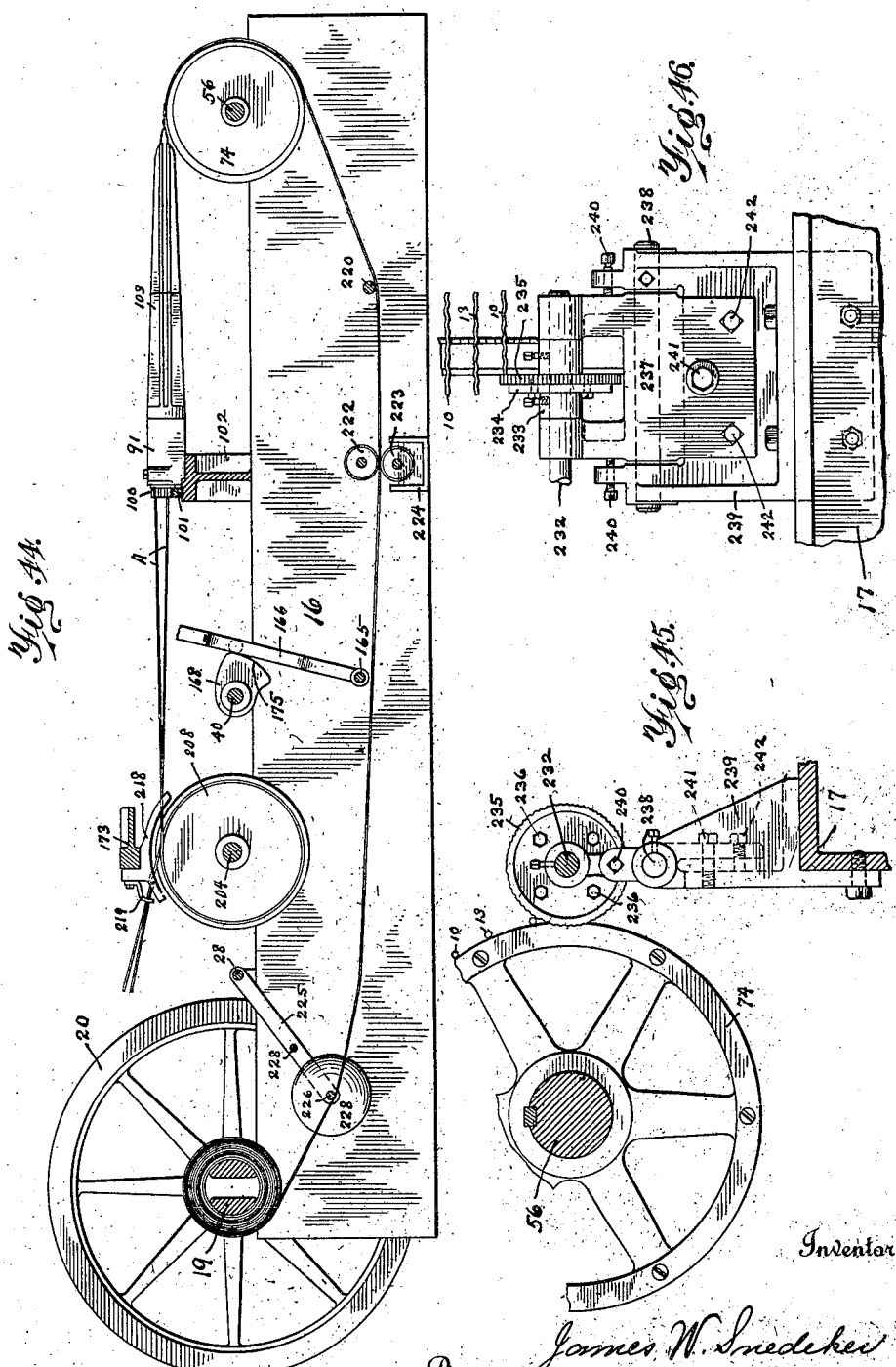

Patented Nov. 27, 1923.

1,475,324

UNITED STATES PATENT OFFICE.

JAMES W. SNEDEKER, OF ADRIAN, MICHIGAN, ASSIGNOR TO PAGE STEEL & WIRE COMPANY, OF ADRIAN, MICHIGAN, A CORPORATION OF NEW JERSEY.

FENCE LOOM.

Application filed September 13, 1922. Serial No. 587,911.

*To all whom it may concern:*

Be it known that I, JAMES W. SNEDEKER, a citizen of the United States, and residing at Adrian, in the county of Lenawee and State of Michigan, have invented a new and Improved Fence Loom, of which the following is a specification.

This invention relates to looms designed for producing ornamental fencing for lawns and gardens, and particularly fencing provided with pickets which are closer together at the bottom of the fence than at the top, and its object is to provide a machine which will twist pairs of wires into longitudinal strands to securely position vertical main pickets whose height is that of the fence and whose upper ends are bent to form arches and are secured by the upper strand wires to the sides of other pickets, and will also securely position other secondary or hair-pin pickets which are bent midway their length to form arches and which have parallel straight portions between each two of the main pickets.

This invention consists of a machine embodying a drum having a series of triangular anvils around which the arches at the ends of the main pickets may be bent, a second drum around which the secondary or hair-pin pickets may be bent so that their ends will lie parallel and between the main pickets, and means for twisting pairs of wires into strands to hold the pickets in position.

It also comprises bifurcated twisters consisting of pairs of channels to receive the pairs of strand wires, the spaces between the channels being of sufficient length to permit the secondary wires to be bent around the anvils provided therefor and pass between the two wires of each strand.

It further consists in the details of construction illustrated in the accompanying drawings and particularly pointed out in the claims.

In the drawings, Fig. 1 is a plan of this improved fence loom, the front end being at the right in the drawing. Fig. 2 is an elevation of the left side thereof. Fig. 3 is a front elevation of the machine. Figs. 4 and 5 are plans of the front end of this machine with the parts in two positions. Fig. 6 is a section on the line 6—6 of Fig. 1. Fig. 7 is a section on the line 7—7 of Fig. 6. Fig. 8 is a section on the line 8—8 of Fig. 7. Fig. 9 is a section on the line 9—9 of Fig. 6. Fig. 10 is a side elevation of one of the main strand twisters. Fig. 11 is a section on the line 11—11 of Fig. 10 on a larger scale. Fig. 12 is a longitudinal section of this twister. Figs. 13 and 14 are sections on the lines 13—13 and 14—14 of Fig. 12. Fig. 15 is an enlargement of the front end of the twister shown in Fig. 12. Fig. 16 is a section on the line 16—16 of Fig. 15. Fig. 17 is a side elevation of one of the two twisters employed for securing the arched ends of the main pickets. Fig. 18 is a section on the line 18—18 of Fig. 17. Fig. 19 is a section on the line 19—19 of Fig. 18. Fig. 20 is a side elevation of the mechanism for actuating the beaters with a beater at the front end of its stroke. Fig. 21 is a similar view of a front end of a twister and the beater at the rear end of its stroke. Fig. 22 is a front elevation of a series of twisters and the beaters adjacent thereto. Fig. 23 is a side elevation taken from within the loom on the line 23—23 of Fig. 1 of the mechanism for bending the arches at the ends of the main pickets. Fig. 24 is a section on the line 24—24 of Fig. 23. Fig. 25 is an elevation of the pulley for driving the fence winding mechanism. Fig. 26 is an elevation of the anvil wheel for the hair-pin pickets. Fig. 27 is a section on the line 27—27 of Fig. 26. Fig. 28 is a side elevation of a portion of a feed wheel. Fig. 29 is a side elevation of a group of driving gears for the several mechanisms for weaving the fence. Figs. 30 and 31 are elevations on the lines 30—30 and 31—31 of Fig. 29 respectively. Fig. 32 is a section on the line 32—32 of Fig. 31 and is also a side elevation of a brake wheel for the strand wires. Fig. 33 is a radial section of the rim of this brake wheel. Fig. 34 is a section on the line 34—34 of Fig. 33. Fig. 35 is a view on a larger scale showing the means for driving the partition ring for separating the two strand wires on a brake wheel. Fig. 36 is a section on the line 36—36 of Fig. 35. Fig. 37 is a side elevation of the driving mechanism for the anvil wheels. Figs. 38 and 39 are sections on the lines 38—38 and 39—39 of Fig. 37. Fig. 40 is an elevation of the crank for driving the twisters. Fig. 41 is a section on the line 41—41 of Fig. 40. Fig. 42 is a section on the line 42—42 of Fig. 41. Fig. 43 is a fragment plan of this crank showing the end of the adjusting screw for the crank pin. Fig. 44 is a diagrammatic longitudinal section of the machine. Fig. 45 is a side elevation of the mechanism for trimming off the ends of the pickets. Fig. 46 is a front elevation thereof.

Similar reference characters refer to like parts throughout the several views.

The fence which is woven on the present loom is shown in Figs. 4 and 5 and consists of a series of strands numbered 1 to 9 inclusive and each formed of two wires twisted together. The strands 8 and 9 may be termed the arch-retaining strands. At regular intervals these strands receive the main pickets 10, the end 11 of each picket being bent to arch form and secured to the second picket following. A hair-pin picket 12 is secured centrally over each alternate main picket, the sides 13 of the hair-pin pickets being midway between the two adjacent main pickets. The direction of twist of the strands is the same between two adjacent main pickets, but is reversed at each main picket. It is therefore the same on both sides of each part 13 of each hair-pin picket. In the present drawings, the pickets are shown of crinkly or wavy wire and it is assumed that they are cut to length before being fed into the machine and that they are introduced manually from the right side of the machine.

As shown in Figs. 1 and 2, the machine has two side frames 15 and 16 connected at the front by the cross member 17. The side frames are also connected by the cross bar 18 and by such other cross bars as will be hereafter described in connection with their specific functions. At the rear end of the machine is a winding drum 19 for the finished fence, which drum may be of the same type as that described in my former Patent No. 1,088,844, dated March 3, 1914. This drum is driven by the pulley 20 and belt 21. The pulley 22 journaled on the shaft 24 is provided to receive a main driving belt for the loom and to it is attached one member 25 of a clutch, the other member 26 being splined on the shaft 24 in the usual manner, this detail not being shown as it is well known. The clutch member 26 is slid into and out of engagement by the arm 27 on the transverse shaft 28, supported by bearings 29 on the side frames. At the opposite end of this shaft 28 is a crank arm 30 from which the link 31 extends to the lever 32 which is convenient to the person operating the machine whose regular position is at that point. Any other desired means may be used to drive this shaft 24 and for controlling its operation. This shaft carries a pinion 34 which meshes with the gear 35 on the main countershaft 36, journaled in the bearings 37 on the side frame 15.

The main countershaft carries a bevel gear 38 at its front end which meshes with the bevel gear 39 on the transverse shaft 40 which is the only constantly running shaft of the loom proper. This shaft actuates the beaters which carry the pickets forward after they have been introduced by hand, it actuates the device for forming the arches on the ends of the main pickets, and it has a pulley 42 on its opposite end which receives the belt 20 (Fig. 25) to drive the winding drum 19. The size of this pulley and the speed of the shaft 40 is such that the belt 20 is liable to slip, especially when the roll of fence on the winding drum becomes large. The tension on the belt may be varied by the idler pulley 43 carried by the arm 44 and adjustable by the screw 45 and nut 46.

The longitudinal shaft 48 is mounted in bearings 47 and actuates the twisters which must remain at rest during the times the pickets are inserted and moved forward by the beaters. In Figs. 29 and 30 a modified Geneva movement is shown connecting the shafts 36 and 48 so as to turn the shaft 48 one fourth rotation for each rotation of the shaft 36 and to secure this movement during about one fourth of the rotation of the shaft 36 so that the shaft 48 will be at rest three fourths of the time and turn one fourth of the time. This gearing consists of the notched plate 49 and the irregular gear 50 on the shaft 48 and the hub 51 on the shaft 36 which hub has a group of teeth 52 and a notch 53.

Each longitudinal strand consists of two strand wires A which are twisted together and the pickets are positioned at regular intervals between the strand wires. As in my above-named patent, the devices for twisting the strands are so formed as to permit the pickets to be slid endwise between the several pairs of wires. The main pickets present no new problem but the hair-pin pickets must be specially provided for.

The anvil drum.

Mounted at the front end of the loom in the bearings 55 is a shaft 56 having a worm gear 57 at its left end. A longitudinal shaft 58 is mounted in bearings 59 and carries a worm 60 at its front end meshing with the worm gear 57. The circumferential distance the anvil drum rotates determines the spacing between the pickets and means are therefore provided for changing the relative rotation of this shaft 58 relative to the shaft 48.

A series of gears 61, 62 and 63, or any other desired number, of different sizes, are secured to the shaft 58. A gear 64 is slidable on but driven by the shaft 48, being secured in any desired position by the screw 65. A bracket 66 on the main frame 15 supports a pair of plates 67, one on each side of the gear 64 which carry the pin 68 on which the idler gear 69 is mounted. The flanges 70 on these plates are circular and formed with slots 71 to receive the bolts 72 so that the idler gear may be swung into engagement with any of the gears on the shaft 58. The shaft 58 and the anvil drum will therefore turn with each intermittent rotation of the shaft 48.

On the anvil drum shaft 56 are mounted a series of wheels 74 having flanges 75 to support the woven fence, particularly the strands thereof, and a series of teeth 76 to engage the pickets so that the fence and its strand wires will be moved step by step through the loom. These teeth are preferably on a ring 76$^a$, adjustable on the wheel 74 so that the teeth of all the wheels may be alined. On this shaft is also mounted an anvil wheel 77 having a series of radially slidable anvils 78 around which the hair-pin pickets are bent as shown in Figs. 4 and 5. As shown in Figs. 26 and 27, these anvils have stems 79 slidable in the flange 80 on the wheel 77, and these anvils are normally held out by the springs 82. Adjacent the anvil wheel 77 is a cam disk 83 having a cam flange 84 adapted to engage the lugs 85 on the anvils. This disk may be positioned by the anvil shaft 56 and has a foot 86 attached to the cross bar 87 which supports the beater guides and is shown in plan in Fig. 4.

The anvils 78 must be out of the path of the sides 13$^a$ of the hair-pin pickets as they are swung from the position shown in solid lines in Fig. 5 to that shown in dotted lines and this is provided for by this cam flange 84 pulling in the anvils. The movements of the driving worm 60 and gear 57 cause the shaft 56 to turn the angular distance between anvils 78 at each actuation of the twisters.

The twisters.

Mounted on the side frames is a cross bar 88 which supports the main bearings 91 and 92 for the twisters. These are of two types, those for twisting the two upper or arch-supporting strands of the fence and those for twisting the remainder of the strands. The latter will be considered first.

Each of these bearings 91 receives the hub 93 of a twister and each hub is provided with two grooves 94 to permit the passage of a strand wire A. The twister has a collar 95 to engage its bearing and two bearing rings 96 forming parts of ball bearings, the remaining parts being the stationary rings 97 and the balls 98. These bearings are adjustable by means of the collars 99 which also prevent endwise movement of the twister. On the rear end of the twister is a pinion 100 meshing with a rack bar 101 slidably supported by the cross bar 88. This cross bar is mounted on pedestals 102 shown in Fig. 2.

The twister is formed of two jaws 103 united at the hub 93 and the flanges 104 flare laterally so as to afford ready entrance for the pickets. The parallel flanges 105 serve as guides for the strand wires A. The front ends of the jaws have passages 106 for these wires and hard steel bushings 107 may be mounted therein to prevent wear. The spaces 108 between the jaws are sufficiently long to permit the longest halves 13$^a$ of the hair-pin pickets to swing through. The length of the space 108 of each main twister is therefore at least equal to the distance to the left ends of the pickets while in the loom.

Where the full length of the spaces 108 is not necessary, because of narrow fencing, the wedge blocks 109 shown in Figs. 10 and 11 may be secured in position by means of the bolts 110 and these wedges prevent the ends of the twisters from being drawn together by the pull of the wires A as they are being twisted together.

Twister driving mechanism.

These twisters are rotated simultaneously in the same direction and to the same extent. For this purpose the pinions 100 mesh with the rack bar 101 which is moved back and forth by a crank 113 shown in Figs. 37 and 40 to 43 inclusive. The shaft 48 has a collar 114 keyed to it and this collar is formed with a ring of worm teeth 115 with which meshes a worm 116 mounted on the shaft 117 carried by the bosses 118 on the hub 119 of the crank 113. The crank is also formed with a series of circular slots 120 to receive the screws 121 by means of which the crank is locked to the collar after being adjusted by the worm 116 so that the action of the rack bar 101 will occur at the exact instant desired. The shaft 48 may be prevented from sliding in the bearings 47 by this collar 114 and the collar 136 on opposite sides of one of the bearings.

Slidably mounted in a slot 122 in this crank is a pin 123 which is mounted on the screw 124 journaled at its inner end in the hub 119 and at its outer end in the plate 125 which is held in position by the screws 126. This pin is slidable between the sides of a yoke 127 provided with a guide arm 128 slidable in the guide bracket 129. The other arm 130 connects to the rack bar 101 by means of the pin 132 which is mounted in a block 133 attached to the rack bar by screws 134, as shown in Fig. 8, and is slidable on the flange 135 of the cross bar 88. Because of the Geneva movement shown in Figs. 29 and 30, the yoke 127 will move from one dotted line position in Fig. 6 to the other, stopping at each end and also stopping at the solid line position during such lateral movements in either direction.

The twisters for arch-retaining strands.

The two arch-retaining strands at the right side of the machine are close together and constitute the top strands of the finished fence. The spaces between the jaws of the twisters for these strands need only be sufficiently long to permit the passage of the turned-in ends 11 of the main pickets 10. These two twisters are shown in Figs. 17, 18 and 19 and are mounted in the bearings 92 on the cross bar 88. Each of these twisters is generally in the form of a cylindrical body 140 with a collar 141 to engage the front side of the bearing 92 and with rings 142 on the other side. A pinion 100 on the rear end of the twister meshes with the rack bar 101 and the body has grooves 143 for the wires A. The front portion of the body is journaled in the bearing 144 mounted on the cross bar 87 which supports the beater guides.

At the front end of the body are a pair of jaws 145 whose inner surfaces are substantially cylindrical to permit free passage of the ends of the main pickets. The pull of the wires A when twisted tends to pull these jaws toward each other and to prevent this, these jaws are formed with circular grooves 146 to receive circular flanges 147 on the plates 148 which are attached to the front end of the bearing 144. The front ends of the twister jaws are formed with passages 149 in which are inserted the hard steel tubes 150. I prefer to provide an overhanging plate 152 on the bearings to prevent accidental injury to the operator by these twisters. The sides of the bearing 144 are formed with slots 153 to permit the passage of the ends 11 of the main pickets.

The operator standing at the right side of the machine introduces the main pickets 10 and the hair-pin pickets alternately, the main pickets being slid horizontally through the spaces between the jaws of all the twisters at about the position of the picket 10 in Fig. 19. The pickets as introduced strike against the stop-plate 155 shown at the left in Fig. 4. The hair-pin pickets are slid in over the twisters at the right of the anvil wheel 77 and are then bent back about as shown in solid lines 13ª in Fig. 5. After the machine has made another one-fourth movement, the operator swings the part 13ª to the position there shown in dotted lines, after which the beaters swing this to the proper position. This part 13ª is swung through the spaces 108 between the jaws of the twisters.

The beaters.

The beater bar 156 (Figs. 20, 21 and 22) is preferably a channel bar secured to shoes 157 slidable between guides 158 carried by the cross bar 87. Secured to this cross bar are the beater guides 159 having downwardly inclined rear ends 160. Arms 162 extend forward from the beater bar 156 and the beaters 163 are pivoted to their front ends. The heels 164 of the beaters are so heavy that these beaters will swing back and down out of the plane of the spaces 108 in the twisters when permitted by the guides 159. The cross bar 87 is preferably mounted on pedestals 162 on the main frames as shown in Fig. 2.

A shaft 165 is mounted in the frames 15 and 16 (Fig. 44) and on it are the arms 166 which carry the rollers 167 adapted to be engaged by the cams 168 on the shaft 40. From the upper ends of these arms 166 the adjustable rods 169 extend to the shoes 170 on the beater bar. Heavy springs 172 connect to these arms and to the cross bar 173 carried by the pedestals 174 on the side frames. These beaters move the picket wires to proper position just before the twisters begin to turn and just before the shaft 56 begins to turn. As the wires A are twisted together to form strands, the anvil drum turns so as to slowly carry the pickets away from the twisters. The cams 168 are therefore formed with eccentric edges 175 which will press the pickets forward as the fence is being formed.

The arch bender.

The arches at the upper edge of the fence are formed as follows. The anvil wheel 177 at the right end of the loom carries anvils 178, twice as large and half as numerous as the anvils 78 on the anvil wheel 74 but otherwise they are similar in form and operation. The cam 179 to pull these anvils 178 inward is a bar shown in Fig. 23. A bracket 176 on the side frame 16 carries a shaft 180 on which are a lower crank arm 181 and a bender 182. The hub 183 of the bender is so large that as each anvil 178 passes, the hub will bend the end of the main picket to the position 11ª in Fig. 4. Further movement bends it to the position 11ᵇ in Fig. 5 and then to 11ᶜ in Fig. 4. The bender carries a small shaft 184 whose outer end is bent and has a notch 185 which is held in the position shown in Fig. 23 by the spring 186, shown in Figs. 4 and 5. As the bender swings from the position shown in Fig. 5 to just beyond the position shown in Fig. 4, the bent end of the shaft slips over the wire 11ᶜ and drops behind it, and the next inward swing of the bender receives the wire in the notch 185 and carries the wire to the position 11 shown in Fig. 5. The next main picket 10 is then pushed up against this inturned end 11 by the proper beater 187, shown in Fig. 17, having a slot 188 in its front end which is so narrow that it holds the two parts 11 and 10 side by side while the strands 8 and 9 are being twisted. This beater 187 is preferably a flat plate attached to the right hand rod 169ᵃ by means of a bracket 189. (Fig. 5.)

The bender 182 is actuated by a rod 191 attached to the crank arm 181 and to the yoke 192 (Fig. 23) which carries a pin 193 extending between the cam flanges 194 on the disk 195 which is loose on the shaft 40. To this cam disk a gear 196 is connected which meshes with a pinion 197 on the countershaft 198 journaled in the pedestal 199. A gear 201 on the opposite end of the shaft 198 meshes with a gear 202 secured on the shaft 40. The gears 201 and 202 are the same size but the pinion 197 is half the size of the gear 196 so that the bender is actuated once for every two rotations of the shaft 40 and therefore at each full stroke of the rack bar 101 which turns the twisters.

The tensioning device.

In order to keep the wires tight while being twisted and insuring strands of the same length, a tension is applied to each wire. A shaft 204 is mounted in bearings 205 carried by the side frames and has a worm gear 206 at its left end meshing with the worm 207 on the shaft 58 which drives the shaft 56 for the anvil drum. This worm gear 206 preferably has one or two more teeth than the worm gear 57 so that the shaft 204 will rotate just a trifle slower than the shaft 56, or the outer diameters of the drums 208 are less than the outer diameters of the drums or flanges 74. Any other device may be so designed that the surface speed of the drums 208 is less than that of the flanges 74 of the anvil drum which will cause the wires A to slip on the drums 208 and thus cause a tension on these wires.

In order to increase the grip on the wires, a dividing ring 209 is mounted on each drum 208 between the wires thereon and positioned by a pin 212, and the drum is notched at intervals to receive the dogs 210 and the pivots 211 by which they are connected. These dogs are prevented from falling out by the ring 209. These dogs are pressed toward each other by the pairs of flat springs 213 which are attached to the spokes 214 by the bolts 215 and clamps 216. The action of these clamping dogs is interrupted at about the points of tangency of the wires to the drums 208 by the shoes 218 which are carried by the cross bar 173. These shoes cause the dogs 210 of each pair to separate and release the wires so that they may freely run onto and leave the drums. Fingers 219 on this cross bar guide the wires to the drums.

The finished fence passes rearwardly below the rod 220 to the drum 19 and in doing so may pass between an upper roller 222 and a lower roller 223 which dips into a trough 224 containing paint or grease. One or both of these rollers may have a soft surface so as to apply the coating evenly. In order to guide the fence to the drum 19, a pair of arms 225 may be mounted on the transverse rod 28 and carry a shaft 226 to which the cupped guides 227 are attached. A brace rod 228 between the arms 225 has been found valuable.

The picket trimmer.

While a stop is provided for the picket wires, it sometimes happens that the pickets do not project the same distance from the strand 1. A device for trimming these pickets consists of a gear 230 on the anvil-drum shaft 56 meshing with a pinion 231 on the shaft 232. Secured to this shaft is a hub 233 and a disk 234 to which a cutter 235 is attached by means of the screws 236. This cutter, therefore, rotates at each actuation of the shaft 56. The shaft 232 is journaled in the upper end of the plate 237 which is mounted to rotate and slide on the shaft 238 carried by the bracket 239. The transverse position of this plate and cutter is determined by the screws 240, while the distance between the pickets and the shaft 232 is determined by the screws 241 and 242 which swing the bottom of the plate 237 out or in. The finished fence then passes rearwardly as previously described.

The details and proportions of this loom may all be changed by those skilled in the art without departing from the spirit of my invention as set forth in the following claims.

I claim :—

1. In a fence loom, the combination of a frame, a rotatable drum mounted thereon and adapted to receive the strands and pickets of a fence and including a wheel intermediate the ends and another at one end of the drum, each having a series of radially movable anvils, means to move the anvils in and out, means to position the pickets, and means to twist the strand wires.

2. In a fence loom, the combination of a frame, a rotatable drum mounted thereon and adapted to receive the strands and pickets of a fence and including a wheel at one end of the drum and another intermediate the end of the drum, a series of radially movable anvils mounted in each wheel around which pickets may be bent, the anvils in the intermediate wheel being approximately half the size of those of the end wheel, means to move the anvils in and out, means to position the pickets, and means to twist the strand wires.

3. In a fence loom, the combination of a rotatable drum comprising wheels to support the strands and teeth attached to said wheels to engage the pickets, an anvil wheel at one end of the drum and a second anvil wheel intermediate the ends of the drum, a series of radially movable anvils mounted in each anvil wheel around which the pickets may be bent, the anvils of the intermediate wheel being in pairs and one half the size of the anvils on the end wheel.

4. In a fence loom, the combination of a rotatable drum comprising wheels to support the pickets and strands and anvil wheels embodying anvils around which pickets may be bent, twisters for the strands embodying a pair of jaws to receive the strand wires, and means to rotate the twisters, said twisters having longitudinal spaces between the jaws whose length is equal to the distance therefrom to the nearest edge of the fence being woven.

5. In a fence loom, the combination of an anvil drum embodying wheels to support and actuate the fence and an anvil wheel intermediate the ends of the drum, said anvil wheel embodying a series of radially movable anvils around which picket wires may be bent to form hair-pin pickets, twisters to form pairs of wires into strands, and means to rotate the twisters, said twisters each comprising a pair of jaws spaced apart to permit one half the hair-pin picket wires to swing through between the jaws and strand wires.

6. In a fence loom, the combination of an anvil drum embodying wheels to support and actuate the woven fence and an anvil wheel intermediate the ends of the drum, said anvil wheel embodying a series of radially movable anvils around which picket wires may be bent to form hair-pin pickets, twisters to form pairs of wires into strands, and means to rotate the twisters in opposite directions, said twisters each comprising a pair of jaws spaced apart to receive the main and hair-pin picket wires alternately and permit one-half of the hair-pin picket wires to swing through between the jaws and strand wires, the twisters reversing direction at each main picket only and the rotation of the twisters being interrupted to permit the insertion of the picket wires and the bending of the hair-pin pickets.

7. In a fence loom, the combination of an anvil drum embodying wheels to support and actuate the woven fence and an anvil wheel embodying a series of anvils around which picket wires may be bent to form hair-pin pickets whose sides extend to a lateral edge of the fence, twisters to form pairs of wires into strands and means to rotate the twisters, said twisters each comprising a pair of jaws spaced apart to receive main and hair-pin picket wires and permit one-half the hair-pin picket wires to swing through between the jaws and strand wires, and beaters to force the main pickets and each side of the hair-pin pickets forward between the strand wires before they are twisted.

8. In a fence loom, the combination of an anvil drum embodying wheels to support and actuate the woven fence and an anvil wheel embodying a series of anvils around which picket wires may be bent to form hair-pin pickets whose sides extend to a lateral edge of the fence, twisters to form pairs of wires into strands and means to rotate the twisters, said twisters each comprising a pair of jaws spaced apart to receive main and hair-pin picket wires and permit one-half the hair-pin picket wires to swing through between the jaws and strand wires, beaters to force the main pickets and each side of the hair-pin pickets forward between the strand wires before they are twisted, said beaters each embodying a pivoted and normally upright member and a foot thereon, and a guide for each beater engaged by said foot to hold the beater upright while moving the picket wires forward but having an inclined rear end permitting the beater to swing back out of the way of the hair-pin pickets to permit them to be bent.

9. In a fence loom, the combination of an anvil drum embodying wheels to support and actuate the fence and an anvil wheel embodying anvils around which pickets are adapted to be bent intermediate their ends, twisters to receive pairs of wires to twist them into strands, said twisters being formed with two jaws spaced apart to permit the insertion of main picket wires and hair-pin picket wires, and means to intermittently turn the twisters in one direction and then intermittently in the opposite direction.

10. In a fence loom, the combination of an anvil drum embodying wheels to support and actuate the fence and an anvil wheel embodying anvils around which pickets are adapted to be bent intermediate their ends, twisters to receive pairs of wires to twist them into strands, said twisters being formed with two jaws spaced apart to permit the insertion of main picket wires and hair-pin picket wires, means to intermittently turn the twisters in one direction and then intermittently in the opposite direction, beaters to move the pickets forward between the strand wires, and means to actuate the beaters during each rest period of the twisters.

11. In a fence loom, the combination of an anvil drum embodying wheels to support and actuate the fence and an anvil wheel embodying anvils around which pickets are adapted to be bent intermediate their ends, twisters to receive pairs of wires to twist them into strands, said twisters being formed with two jaws spaced apart to permit the insertion of main picket wires and hair-pin picket wires, means to intermittently turn the twisters in one direction and then intermittently in the opposite direction, beaters to move the pickets forward from the spaces between the jaws of the twisters to between the wires of the strands at each rest period of the twisters, and springs to return the beaters.

12. In a fence loom, the combination of a drum to receive the strands and the main and hair-pin pickets of a fence and embodying an anvil wheel having radial projections about which the hair-pin pickets may be bent midway their length and be positioned symmetrical to each main picket, means to move the pickets forward between the strand wires, and means to twist the wires, the direction of the twisting being reversed at each main picket but being the same on both sides of each part of each hair-pin picket.

13. In a fence loom, the combination of a drum embodying wheels to support the strands and pickets of a fence and a pair of anvil wheels embodying anvils around which the pickets may be bent, one of the anvil wheels being at one end of the drum and the other intermediate the ends, twisters for the strands embodying pairs of spaced jaws to receive the strand wires, and means to intermittently rotate the twisters, the spaces between the jaws of the twisters at one side of the intermediate anvil wheel being equal in length to the distance from the intermediate anvil wheel to one edge of the fence.

14. In a fence loom, the combination of a drum embodying wheels to support the strands and pickets of a fence and a pair of anvil wheels embodying anvils around which the pickets may be bent, one of the anvil wheels being at one end of the drum and the other intermediate the ends, twisters for the strands embodying pairs of spaced jaws to receive the strand wires, and means to intermittently rotate the twisters, the spaces between the jaws of the twisters at one side of the intermediate anvil wheel being equal in length to the distance from the intermediate anvil wheel to one edge of the fence, the length of the spaces between the jaws of the two twisters at the other anvil wheel being equal to the distance from the inner of these two twisters to the adjacent edge of the fence.

15. In a fence loom, the combination of a drum embodying wheels to support the strands and pickets of a fence and a pair of anvil wheels embodying anvils around which the pickets may be bent, one of the anvil wheels being at one end of the drum and the other intermediate the ends, twisters for the strands embodying pairs of spaced jaws to receive the strand wires, means to intermittently rotate the twisters, the spaces between the jaws of the twisters at one side of the intermediate anvil wheel being equal in length to the distance from the intermediate anvil wheel to one edge of the fence, the length of the spaces between the jaws of the two twisters at the other anvil wheel being equal to the distance from the inner of these two twisters to the adjacent edge of the fence, said means to rotate the twisters comprising a shaft rotating once for each cycle of the loom, a second shaft, a Geneva gear whereby the second shaft is given one fourth rotation for each rotation of the first shaft and in one fourth of such period, a rack bar moved back and forth at each rotation of the second shaft, and pinions on the twisters meshing with the rack bar so that said twisters will turn twice in one direction and then twice in the opposite direction.

16. In a fence loom, the combination of a rotatable drum comprising wheels to support the pickets and strands and anvil wheels embodying anvils around which pickets may be bent, twisters for the strands embodying a pair of jaws to receive the strand wires, means to rotate the twisters, said twisters having longitudinal spaces between the jaws whose length is equal to the distance therefrom to the nearest edge of the fence being woven, said means to rotate the twisters comprising a shaft rotating once for each cycle of the loom, a second shaft, a Geneva gear whereby the second shaft is given one-fourth rotation for each rotation of the first shaft and in one-fourth of such period, a rack bar moved back and forth at each rotation of the second shaft, and pinions on the twisters meshing with the rack bar so that said twisters will turn twice in one direction and then twice in the opposite direction.

17. In a fence loom, the combination of a support embodying a series of projections around which picket wires may be bent to form hair-pin pickets, and twisters to form pairs of wires into strands to secure the pickets, one of said twisters comprising a pair of jaws spaced apart to permit one half the wires for said pickets to swing through between the jaws and strand wires.

18. In a fence loom, the combination of a support embodying a series of projections around which picket wires may be bent to form hair-pin pickets, and between which main picket wires may be placed, and means to twist strand wires together to secure the main and hair-pin pickets, the direction of the twisting being reversed at each main picket but being the same on both sides of each part of each hair-pin picket.

19. In a fence loom, the combination of a rotatable drum comprising wheels to support the pickets and strands of the fence, means to twist pairs of wires into the strands, means to position the pickets between the wires of each strand, means to rotate the drum to pull the wires through the twisters, a series of brake drums around which the pairs of wires pass before entering the twisters, resilient means mounted on the brake drums to grip the wires, and means to control the rotation of the brake drums so that their surface speeds will be less than the speed of the wires.

20. In a fence loom, the combination of a rotatable drum comprising wheels to support the pickets and strands of the fence, means to twist pairs of wires into the strands, means to position the pickets between the wires of each strand, means to rotate the drum to pull the wires through the twisters, a series of brake drums around which the pairs of wires pass before entering the twisters, resilient means mounted on the brake drums to grip the wires, a ring mounted on each brake drum to separate the wires thereon, and means to control the rotation of the brake drums so that their surface speeds will be less than the speed of the wires.

21. In a fence loom, the combination of a rotatable drum comprising wheels to support the pickets and strands of the fence, means to twist pairs of wires into the strands, means to position the pickets between the wires of each strand, means to rotate the drum to pull the wires through the twisters, a series of brake drums around which the pairs of wires pass before entering the twisters, resilient means mounted on the brake drums to grip the wires, comprising pairs of dogs between which pairs of wires pass and a ring on each drum between the wires to separate them, and springs to press the dogs toward each other and against the wires.

JAMES W. SNEDEKER.